United States Patent
Dreier

[15] 3,659,888
[45] May 2, 1972

[54] FEED BUNK SHOVEL

[72] Inventor: Melvin E. Dreier, Dumont, Iowa 50625
[22] Filed: Oct. 3, 1969
[21] Appl. No.: 863,528

[52] U.S. Cl. ..................................294/49, 294/51, 294/55
[51] Int. Cl. .........................................................A01b 1/02
[58] Field of Search....................294/49, 51, 53.5, 54, 55, 59

[56] References Cited

UNITED STATES PATENTS

| | | | |
|---|---|---|---|
| 2,486,434 | 11/1949 | Plummer | 294/51 |
| 2,025,678 | 12/1935 | Brady | 294/49 |
| 2,473,647 | 6/1949 | Hulstedt | 294/53.5 |
| 2,666,662 | 1/1954 | McLeod | 294/54 |

Primary Examiner—Evon C. Blunk
Assistant Examiner—Johnny D. Cherry
Attorney—Morton S. Adler

[57] ABSTRACT

A shovel to remove spoiled silage and other material from cattle feed bunks. Includes a flat bottom with vertical sides. The front end of the shovel is open and the rear end is provided with an inwardly swinging gate so that the shovel can scoop material in either a forward or rearward movement. The gate swings closed when the shovel is lifted for unloading to keep the material from sliding off of the rear. A suitable handle is attached to an arched support between the sides so as to be sufficiently elevated for manipulation from a point outside of the sideboards of the feed bunk.

6 Claims, 4 Drawing Figures

Patented May 2, 1972 3,659,888
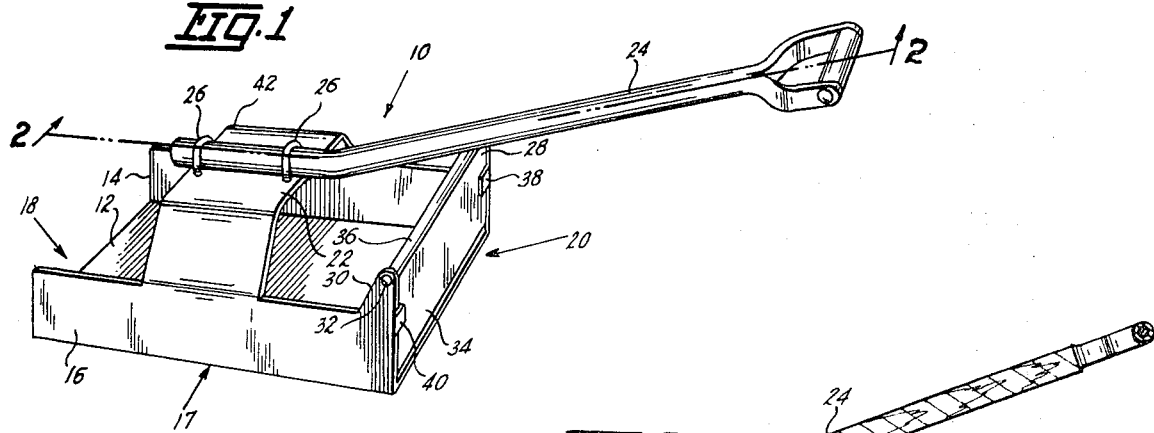
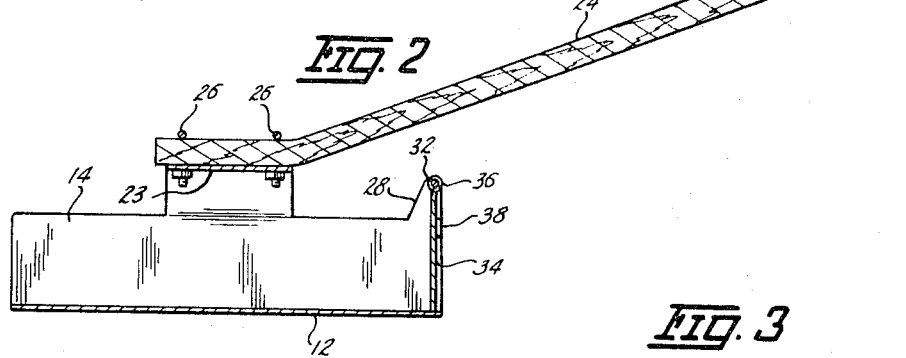
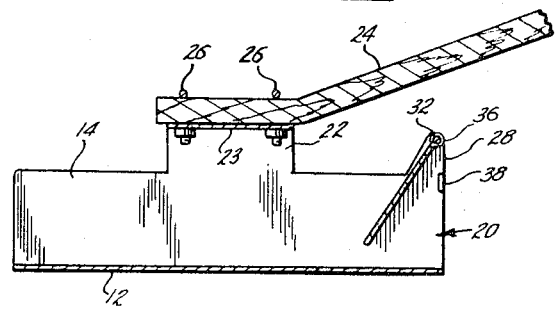
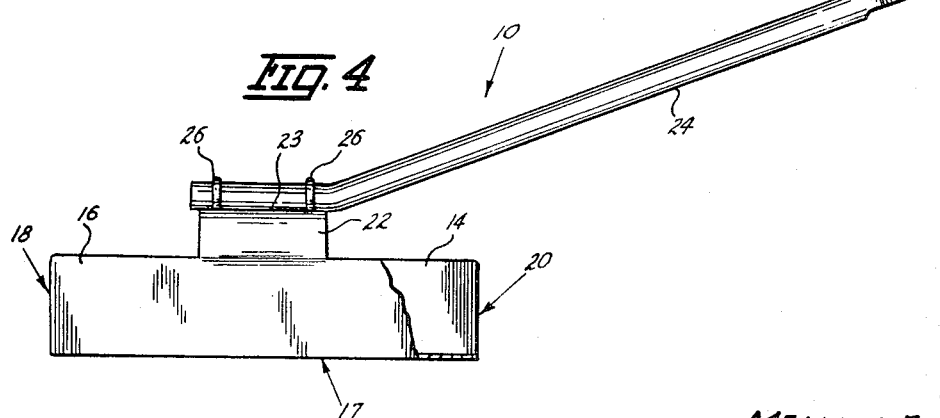
INVENTOR.
MELVIN E. DREIER
BY Morton S. Adler
ATTORNEY.

3,659,888

FEED BUNK SHOVEL

BACKGROUND OF THE INVENTION

1. Field of the Invention

This invention relates to an improved shovel for cleaning cattle feed bunks and is particularly adapted for cleaning relatively narrow bunks commonly used with automatic feeders whereby the user of the shovel can remain outside of the confines of the feed bunk.

2. Description of the Prior Art

It is necessary to clean spoiled silage and other material from cattle feed bunks from time to time since cattle are inclined not to eat new feed if it is near or mixed and any old or spoiled material. Such material is frequently caked or hardened and in cold climates may be even frozen and, so far as can be determined, the customary method of removing the same is by ordinary type shovels with personnel generally entering the feed bunk for purposes of scooping up the material to be removed. Since type of feed bunks with automatic feeding devices are relatively narrow so as to leave little room for a person to conveniently enter the bunk in order to remove the spoiled material by conventional shoveling, the primary object of the present invention is to provide the new and improved design feed bunk shovel which will be highly efficient in removing spoiled material from feed bunks and which can be manipulated by a person from a point outside of the sideboards of the feed bunk.

SUMMARY

This new shovel is channel shaped in cross section having a flat bottom with vertical upstanding sides which are bridged by a relatively wide and rigid arched yoke to which one end of an elongated shovel handle is suitably attached. The front end of this shovel is open and the rear end is provided with an inwardly swinging gate with suitable stop means to hold it from swinging outwardly. The shape of this shovel is designed to cleanly scrape adjoining bunk wall and floor corner areas and may accumulate material either in a forwardly or rearwardly movement due to the open front end and the inwardly swinging gate at the rear. The rear gate serves as a stop to hold material accumulated in the shovel as it is lifted for unloading. The height of the yoke is such that the handle is suitably elevated to conveniently permit use of this shovel within the bunk with the person using the shovel being outside of the bunk.

BRIEF DESCRIPTION OF THE DRAWINGS

FIG. 1 is a perspective view showing a preferred embodiment of this new feed bunk shovel, FIG. 2 is a sectional view taken on the line 2—2 of FIG. 1 and showing the rear swinging gate in closed position, FIG. 3 is a view similar to that in FIG. 2 but showing the swinging gate in open position, and FIG. 4 is a side elevational view partly in section.

DESCRIPTION OF THE PREFERRED EMBODIMENT

Referring to the drawings, this new shovel is designated generally by the numeral 10 and is channel shaped in cross section including the flat and preferably rectangular bottom 12 having the longitudinal upstanding perpendicular sides 14 and 16 to form a scoop 17 with a front end 18 and a rear end 20. The upper edges of the sides 14 and 16 intermediate the front and rear ends thereof are connected by a relatively wide and rigid arched member or yoke 22 which provides an elevated surface 23 relative to bottom 12 and to which one end of an elongated handle member 24 is rigidly secured in any suitable manner. As shown, such handle is attached to the elevated portion 23 of yoke 22 by means of a pair of spaced U-bolts 26 but it will be appreciated that any suitable fastening means may be utilized for this purpose.

The respective rear ends of sides 14 and 16 extend upwardly and parallel to form the spaced apertured ears 28 and 30 to which there is mounted a pin or rod 32. A gate or closure member 34 is disposed across the rear end 20 between sides 14 and 16 and is disposed to swingably depend from pin 32 in any suitable manner such as by the integral tubular sleeve 36 on one longitudinal edge of such gate which is slidably arranged on pin 32 as shown. Such gate is adapted to swing relative to sides 14 and 16 and bottom 12 toward the front end 18 as seen in FIG. 3 and is limited in any rearward movement outwardly from the rear ends of sides 14 and 16 by the respective stops 38 and 40 disposed at the rearward edge of sides 14 and 16 as shown in FIG. 1.

Shovel 10 as described has been particularly designed for use in relatively narrow feed bunks and while dimensions of this shovel are not critical, preferably bottom 12 is approximately 16 inches in length and 12 inches in width with side members 14 and 16 being approximately 3½ inches high. Yoke member 22 is approximately 5 inches wide to provide strength and rigidity to permit the application of heavy pressure on handle 24 in either forward or rear strokes for dislodging caked, hardened or frozen material and may be designed in varying heights so that handle 24 can clear sideboards of the feed bunks which may be of different heights such as 6 to 12 inches or more.

In the use of this shovel, it will be appreciated that the channel shaped design affords maximum efficiency in the cleaning of corner areas of a feed bunk and that material may be scooped up either in a forwardly or rearwardly motion thereof with the forward and rearward edges of bottom 12 and sides 14 and 16 providing in effect channel shaped scraper blades. In a forward motion, the open front end affords easy access to loosened material and in the rearward movement, the contact of any material with gate 34 will cause such gate to swing inwardly as seen in FIG. 3 so that in such rearward movement, the rear 20 of scoop is also open for reception of the loosened material. In raising the shovel for purposes of unloading the same, gate 34 will swing by gravity to its closed position against stops 38 and 40 as shown in FIG. 1 where in the lifting of the shovel 10 to dispose of the scooped material, the closed gate will prevent any material from falling off the rear end 20.

From all of the foregoing, it is thought that a full understanding of the construction and use of this invention will be had and the advantages of the same will be appreciated.

I claim:

1. A shovel, comprising:
   a scoop member having a flat rectangular rigid bottom defining respective front and rear ends and opposed side edges,
   an upstanding perpendicular rigid side on each side edge,
   said bottom and sides defining a channel-shaped scraper blade at said respective front and rear ends of said scoop member,
   a rigid yoke connecting said sides intermediate said front and rear ends,
   an elongated handle connected at one end to said yoke, a vertically disposed gate at said rear end intermediate said sides, and
   means movably connecting only the upper portion of said gate to the upper extremities of said sides whereby said gate is freely swingable to and from open and closed positions.

2. A shovel as defined in claim 1 including:
   said yoke being of a substantially arched configuration so as to extend at least in part across said bottom at a predetermined elevated plane and parallel thereto, and
   said handle being rigidly secured to that portion of said yoke passing through said elevated plane.

3. A shovel as defined in claim 1 including:
   stop means on said sides engageable with said gate to prevent any swinging movement thereof outwardly from said rear end.

4. A shovel as defined in claim 1 including:
   a rod mounted between the upper extremity of said sides at said rear end, a gate swingingly depending from said rod to provide a closure for said scoop at said rear end, said gate designed to be acted upon by material being scooped in the rearward movement of said scoop member so that said gate swings toward said front end to permit entry of said material into said scoop member, and stop means on said sides engageable with said gate to prevent any swinging movement thereof outwardly from said rear end.

5. A shovel, comprising:

a scoop member having a flat rectangular rigid bottom defining respective front and rear ends and opposed side edges, an upstanding perpendicular rigid side on each side edge, a rigid yoke rigidly connected to said sides intermediate said front and rear ends, an elongated handle rigidly connected at one end to said yoke, a vertically disposed gate at said rear end intermediate said sides, and means movably connecting only the upper portion of said gate to the upper extremities of said sides whereby said gate is freely swingable to and from open and closed positions.

6. A shovel as defined in claim 5 including:

a rod mounted between the upper extremity of said sides at said rear end, a gate swingingly depending from said rod to provide a closure for said scoop at said rear end, said gate designed to be acted upon by material being scooped in the rearward movement of said scoop member so that said gate swings toward said front end to permit entry of said material into said scoop member, and stop means on said sides engageable with said gate to prevent any swinging movement thereof outwardly from said rear end.

* * * * *